United States Patent [19]
Barrat et al.

[11] Patent Number: 5,347,089
[45] Date of Patent: Sep. 13, 1994

[54] BRANCH OFF

[75] Inventors: Alan Barrat; Graham Miles, both of Swindon, England

[73] Assignee: Raychem Limited, United Kingdom

[21] Appl. No.: 958,340

[22] PCT Filed: Jun. 20, 1991

[86] PCT No.: PCT/GB91/00994

§ 371 Date: Dec. 16, 1992

§ 102(e) Date: Dec. 16, 1992

[87] PCT Pub. No.: WO92/00623

PCT Pub. Date: Jan. 9, 1992

[30] Foreign Application Priority Data

Jun. 22, 1990 [GB] United Kingdom ............ 9013987.4

[51] Int. Cl.⁵ .................................................. H02G 15/08
[52] U.S. Cl. ...................................... 174/84 R; 29/868; 156/49; 174/88 R; 174/DIG. 8
[58] Field of Search .............. 174/84 R, 88 R, 72 R, 174/DIG. 8; 29/868, 869; 156/49

[56] References Cited

U.S. PATENT DOCUMENTS

| | | | |
|---|---|---|---|
| 4,246,687 | 1/1981 | Nolf | 174/DIG. 8 X |
| 4,400,579 | 8/1983 | Nolf | 174/DIG. 8 X |
| 4,420,654 | 12/1983 | Muller | 174/92 |
| 4,625,073 | 11/1986 | Breesch et al. | 174/72 R X |
| 4,648,924 | 3/1987 | Nolf | 174/DIG. 8 X |
| 4,954,670 | 9/1990 | Jensen et al. | 174/DIG. 8 X |

FOREIGN PATENT DOCUMENTS

| | | |
|---|---|---|
| 1604981 | 12/1981 | European Pat. Off. . |
| 0323752 | 12/1989 | European Pat. Off. . |
| 615071 | 6/1935 | Fed. Rep. of Germany . |
| 3105471 | 9/1982 | Fed. Rep. of Germany ... 174/DIG. 8 |
| 3614426 | 11/1987 | Fed. Rep. of Germany ... 174/DIG. 8 |
| 3738586 | 5/1989 | Fed. Rep. of Germany . |
| WO90/00470 | 1/1990 | World Int. Prop. O. . |

*Primary Examiner*—Morris H. Nimmo
*Attorney, Agent, or Firm*—Sheri M. Novack; Herbert G. Burkard

[57] ABSTRACT

An arrangement for enclosing a branch-off between a pair of cables (2,3,4) comprises a dimensionally recoverable sleeve (5) which can surround the branch-off, and one or more clips (6) which can be positioned about opposed walls of the sleeve to divide the sleeve into channels for the cables. The or each clip (6) is of unitary form and has a pair of legs (8) that are splayed outwardly to facilitate positioning of the clip over the sleeve walls. The or each clip is deformable so that the legs can be forced towards each other after the clip has been positioned on the sleeve walls but is sufficiently rigid, at least in its deformed state, it will resist opening out of the legs under the recovery forces of the sleeve.

The invention provides a relatively simple and easy to install enclosure for branch-offs in harnesses for example that are intended to be used in automotive vehicles.

13 Claims, 2 Drawing Sheets

BRANCH OFF

This invention relates to dimensionally recoverable articles and especially to the use of such articles for the insulation and/or protection of elongate objects such as cable harnesses.

Dimensionally recoverable articles, especially heat-shrinkable articles, are now widely used in many areas where insulation, sealing and encapsulation are required. Usually these articles recover, on heating, towards an original shape from which they have previously been deformed, but the term "heat-recoverable", as used herein, also includes an article which, on heating, adopts a new configuration, even if it has not been previously deformed.

In their most common form, such articles comprise a heat-shrinkable sleeve made from a polymeric material exhibiting the property of elastic or plastic memory as described, for example, in U.S. Pat. Nos. 2,027,962; 3,086,242 and 3,957,372. As is made clear in, for example U.S. Pat. 2,027,962, the original dimensionally heat-stable form may be a transient form in a continuous process in which, for example, an extruded tube is expanded, whilst hot, to a dimensionally heat-unstable form but, in other applications, a preformed dimensionally heat stable article is deformed to a dimensionally heat unstable form in a separate stage.

In other articles, as described, for example, in British Patent 1,440,524, an elastomeric member such as an outer tubular member is held in a stretched state by a second member, such as an inner tubular member, which, upon heating, weakens and thus allows the elastomeric member to recover.

In certain circumstances it is necessary to enclose a branch in an electrical cable, in which case a clip may be employed to bifurcate the dimensionally recoverable article into two (or more) outlets for the cable, a number of such clips being described in UK patent specification No. 1,604,981. However, most clip arrangements that have been proposed are intended for use with telecommunications cables. The present invention, however, is intended to be employed for enclosing branch-offs in smaller cables such as an electrical wiring harness, especially one that is intended for use in a high temperature sealed environment, e.g. for military use. In contrast with branch-offs employed for telecommunications, these branch-offs are often subjected to prolonged periods in use during which the temperature rises above the recovery temperature of the sleeve so that the clip is therefore again subjected to the "milking off" forces, sometimes on a continual basis and often in the presence of vibration.

According to one aspect, the present invention provides an arrangement for enclosing a branch-off between a pair of elongate bodies, which comprises a dimensionally recoverable sleeve which can surround the branch-off, and one or more clips which can be positioned about opposed walls of the sleeve to divide the sleeve into channels for the bodies, the or each clip being of unitary form and having a pair of legs that are splayed outwardly to facilitate positioning of the clip over the sleeve walls, the or each clip being deformable so that the legs can be forced towards each other after the clip has been positioned on the sleeve walls but sufficiently rigid, at least in is deformed state, to resist opening out of the legs under the recovery forces of the sleeve.

The arrangement according to the invention has the advantage that it is relatively simple and easy to install even where small articles are to be enclosed, e.g. branch-offs having dimensions in the order of a few centimeters or less. In addition, the arrangement can be used to form an effective seal, at least in the preferred forms of arrangement, when the cable or harness is subjected to elevated temperatures as may be found in an automotive or military environment.

The clip is preferably in a generally sheet-like form, each leg having a major surface that faces the other leg, and most preferably has been formed by stamping a shape out of sheet material and folding it into the appropriate shape. This form of clip may easily be pushed onto the edge of the recoverable sleeve due to the splayed out configuration of the legs, and then pressed by means of a pair of pliers or other tool, to force the legs together about the sleeve walls. The clip legs will normally be splayed outwardly by an angle of at least 10° and especially at least 20°, but preferably by not more than 50° and especially not more than 40°, the angle typically being about 30°. The clip is preferably formed from a metal, e.g. copper or stainless steel, and will usually have a thickness in the range of from 0.01 to 0.1 times the length of the legs, or typically from 0.4 to 0.8 mm. Such a thickness will normally allow the legs of the clip easily to be forced together by means of a hand-held tool but will give the clip sufficient rigidity in its central region where the legs join to prevent the legs being opened out under the recovery fores of the sleeve.

The clip will normally have a substantially "U" or "V" shaped configuration so that each leg is positioned outside the sleeve walls, although it is quite possible for the clip to have more legs if desired. For example, it could be formed with three legs in a substantially "E" shaped configuration so that the central leg is inserted between the sleeve walls, the central leg being employed, for example, to carry additional adhesive and/or to provide a high conductivity heat-transfer path to the interior of the sleeve.

The clip preferably has legs whose width decreases in a direction away from the central region of the clip. Where such a clip configuration is adopted, the outlet channels formed for the cables will normally be oriented to diverge from one another rather than parallel to one another, which corresponds more closely with the orientation provided by existing moulded parts employed for harness branch-offs. The lateral edges of each clip leg may be curved or straight, but will often be substantially straight over at least a major part of their length, in which case the straight parts preferably subtend an angle in the range of at least 5° and especially from 10° to 50° to each other, but preferably not more than 40° and especially not more than 30° to each other, the angle determining to some extent the angle at which the cables leave the branch-off. In some instances it may be preferable for the cables to be parallel, in which case a clip having parallel lateral edges is preferred.

It may be desirable for the edges of the part of the clip joining the legs to be slightly concave so as to form a slight waist. This will help prevent any cutting of the cables leaving the branch-off by the clip. In addition or alternatively it may be preferred for the end region of each of the legs to be curved outwards slightly in order to prevent any damage to the sleeve by the clip.

In an alternative arrangement the clip may be formed from a wire rather than a sheet, for example a wire loop or a wire that is folded substantially to form a loop.

In whichever form the clip is made, it is preferred in some cases for the lateral dimensions of the clip (at least when fully installed and at least at the region thereof joining the legs) to be greater in the plane of the elongate bodies (herein referred to as the width of the clip) than in the direction normal to this plane (herein referred to as the height of the clip). The use of a relatively wide clip in sheet form has the advantage that the part of the clip at the end of the sleeve acts as a dam and prevents fused adhesive flowing directly out of the end of the sleeve. As the sleeve recovers, fused adhesive is forced laterally towards the elongate bodies and fills the small spaces extending along the elongate bodies which are created between each elongate body and the two opposed walls of the sleeve as the sleeve becomes taught. If these spaces are not filled they can provide leak paths for the ingress of moisture. In addition, a relatively wide clip can act as a spacer to maintain the sleeve in its correct configuration during sustained exposure to temperatures above the recovery temperature of the sleeve.

It is quite possible to employ two or more clips to divide the recoverable sleeve into three or more outlet channels, and in many cases such a configuration will be required, although arrangements in which more than two clips are employed will be relatively rare.

The dimensionally recoverable article will usually be provided with a layer of adhesive or sealant on its internal surface for preventing moisture ingress. Adhesives or sealants that maybe employed include, hot-melt adhesives, e.g. those based on ethylene homo or copolymers, e.g. ethylene vinyl acetate or ethylene ethyl, acrylate, and polyamide adhesives, for example formed from polyamides having a relatively large number (e.g. >15) of carbon atoms between adjacent carbonyl groups, preferred polyamides being based on dimer diamines as described in U.S. Pat. Nos. 4,018,733 and 4,181,775.

The arrangement according to the invention is particularly appropriate for use with recoverable sleeves that are to be sealed from moisture ingress by means of an adhesive that is cured when or after the sleeve is recovered, for example, a two part epoxy adhesive that may be mixed and applied to the sleeve just before recovery. It is particularly advantageous for the curable adhesive to be pre-coated on the sleeve, in which case it is preferably in particulate form so that the reactive components exist separately from one another in the form of particles until recovery of the sleeve. Particulate adhesives that my be employed are described in British patent application No. 2,104,800 A and in European patent application No. 157,478, the disclosures of which are incorporated herein by reference.

The branch-off may need to be screened against electromagnetic interference in which case an electrically conductive shield can be provided inside the recoverable article, for example in the form of a conformable metal layer, or a shield can be placed about the branch-off and connected to shielding on the cables or wiring before recovery of the article. Thus, for example, a braid may be placed about the branch-off and connected to exposed lengths of shielding on the cables or wiring by means of an electrically conductive adhesive containing metal flake or solder or by other means such as clips, wire whipping etc, and the dimensionally recoverable article may then be positioned over the screened branch-off. The walls of the braid can be brought together at one end of the braid and secured together between a pair of cables by means of an additional mechanical retainer, or they may simply be forced together by means of the clip.

The sleeve may be manufactured in a hollow tubular form in which case it will need to be positioned over the ends of the harness or cable and slid along it until it is in position over the branch-off. For applications in which this is inconvenient it may be desirable to form the sleeve as a so-called "wraparound" article in which the article has a slit extending along its length to enable it to be located directly over the branch-off without access to the ends of the harness, and is provided with means for retaining the opposed edges of the sleeve formed by the slit together during and after recovery. This is preferably achieved by means of the rail-and-channel closure described in British patent No. 1,155,470, although other means may be employed, for example, pressure sensitive adhesive on one or both edges and/or an adhesive patch extending over the edge region.

The sleeve will normally be formed by moulding, having one end of diameter larger than the other although it is possible for it to be formed by extrusion. Also, while the arrangement will normally be employed to enlose branch-offs in which a single cable exits from one end, it is possible for more than one cable to exit both ends of the sleeve. Indeed it is possible for the sleeve to be formed from a length of dimensionally recoverable tape that is wrapped around the area to be enclosed. In this form of arrangement the clip may be used to secure the free end of the tape in addition to dividing the sleeve into channels.

Also, the sleeve may be employed to terminate cable at an electrical connector so that, in effect, the cable branches into two or more immediately after the connector.

According to another aspect, the invention provides a method of enclosing a branch-off between a pair of elongate bodies, which comprises:
 (i) positioning a dimensionally recoverable sleeve about the branch-off;
 (ii) positioning a clip about opposed walls of the sleeve to divide the sleeve into channels for the bodies, the clip being of unitary form and having a pair of legs that are splayed outwardly to facilitate positioning of the clip over the sleeve;
 (iii) forcing the legs of the clip towards each other into engagement with the sleeve walls; and
 (iv) recovering the sleeve about the branch-off;
the clip being sufficiently rigid, at least after its legs have ben forced towards each other, to resist opening out the legs under the recovery forces of the sleeve.

It is possible for steps (iii) and (iv) to be carried out simultaneously, or even in reverse order, if step (iii) is performed when the sleeve is hot during recovery. Preferably, however, step (iii) will be performed before step (iv). When the clip has been inserted on the sleeve, the sleeve walls are preferably positioned substantially in the plane of the axes of the elongate bodies so that the unresolved recovery in the various parts of the sleeve are matched more closely and differential stresses in the sleeve are reduced.

Three forms of arrangement in accordance with the present invention will now be described by way of example with reference to the accompanying drawings in which.

Figure 1:
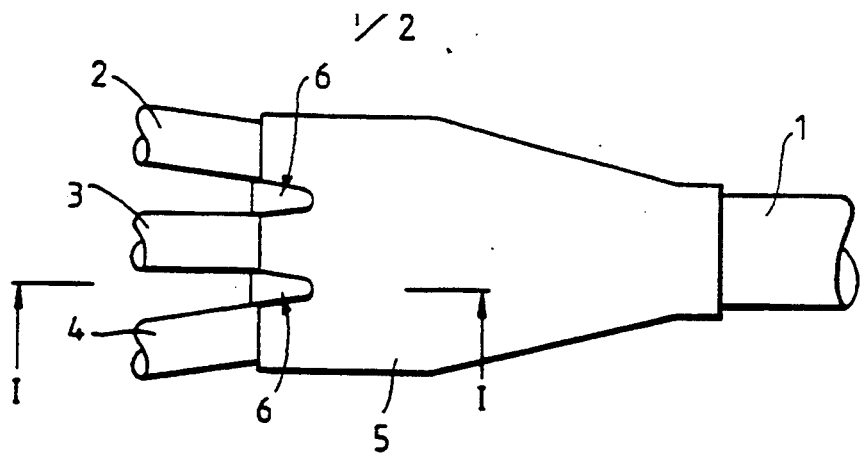
FIG. 1 is a side view of one form of arrangement
Figure 2:
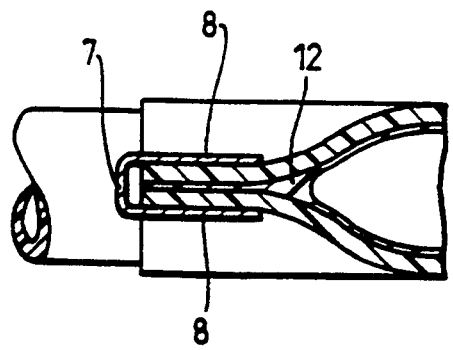
FIG. 2 is a sectional elevation taken along the line I—I of FIG. 1.
Figure 3:
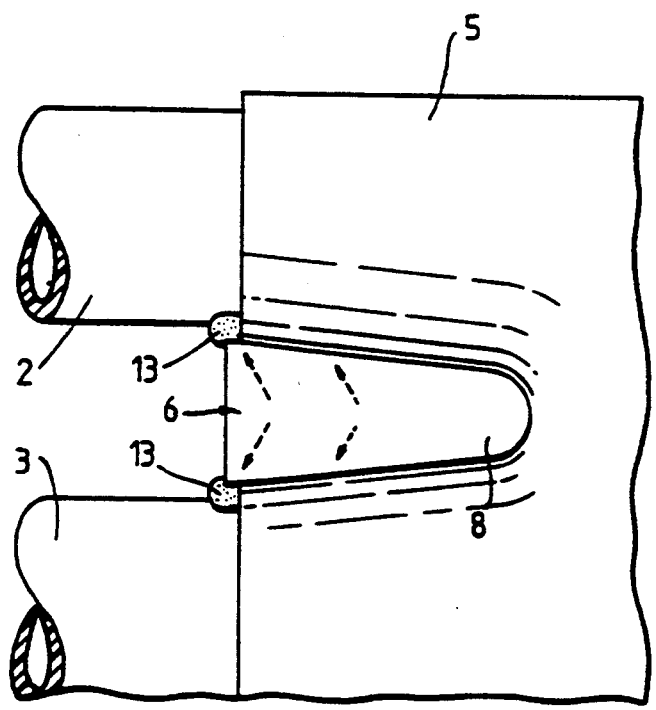
FIG. 3 is a view showing the clip region in greater detail.

Referring to the accompanying drawings, FIGS. 1 to 3 show one form of arrangement according to the invention after recovery about a branch-off in a cable harness. The harness includes a cable 1 which is divided into three small cables 2 to 4. The region of the harness divides into the smaller cables or branch-off region is provided with a heat-shrinkable sleeve 5 which has been slipped over the end of one of the cables and slid along the cable to cover the branch-off region. The sleeve is provided on its internal surface, at least in the region of each of the ends thereof, with a coating of a particulate latent curable epoxy/polyamide adhesive 12 of the type described in the British patent application 2,104,800 A.

After the sleeve has been positioned over the branch-off two substantially "U" shaped clips 6 each having a central region 7 and a pair of legs 8 extending therefrom, are pushed onto the end of the sleeve 5 so that the legs 8 remain outside the sleeve walls. The legs of each clip are then forced together by means of a thin pair of pliers, or other suitable hand-held gripping tool, so that the clip grips the sleeve. The arrangement can then simply be heated, for example, by means of a gas torch, hot-air gun or oven, to cause the sleeve to recover and the adhesive to melt and cure.

During recovery of the sleeve, the adhesive will melt and flow for a period of time before it begins to cure. This flow of adhesive can cause adhesive to be forced through any small channels that would otherwise provide leak paths for moisture ingress. The relatively large width of the clip will cause central region 7 to prevent flow of the fused adhesive directly out of the end of the sleeve. Instead the adhesive is forced in a lateral direction by the recovery forces of the sleeve, as shown by the arrows, and the adhesive fills the small channels of triangular cross-section which extend along the cables 2 to 4 and are caused by taughtening of the sleeve. As can be seen in FIG. 3, fillets 13 of adhesive are formed in these regions indicating that the leak paths are completely sealed.

The sleeve 5 may be formed from a cut length of extruded tubing, but it is preferable for it to be formed as a moulded part. The moulded part is preferably formed with a configuration such that, in its pre-expanded or fully recovered form, it has one end of larger diameter than the other end, as described in our copending applications entitled "Harness and cable Branch-off" and "Branch-off Arrangement" filed on even date herewith (Agents Refs: RK431 and RK432, which claim priority from British applications Nos. 9013985.8 and 9013986.6), the disclosures of which are incorporated herein by reference.

Figure 4:
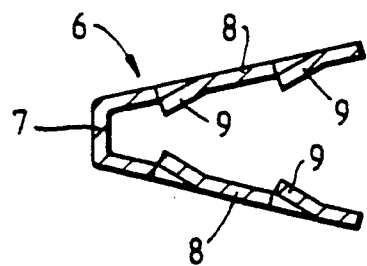
FIG. 4 is a section through a second form of clip used in the arrangement.
Figure 5:
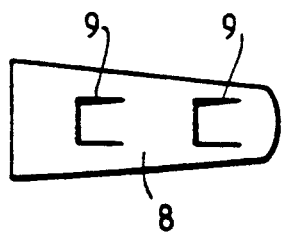
FIG. 5 is a top view of the clip of FIG. 4.

A second form of clip 6 is shown in FIGS. 4 and 5. This clip is formed from 0.635 mm thick stainless steel sheet and pressed into the configuration shown in FIG. 3 in which it has a generally flat control region 7 and a pair of legs 8. Each leg 8 includes a pair of rigid rectangular flaps 9 that have been pressed out of the sheet material and which extend inwardly between the legs to a small extent. The clip may be employed with a recoverable sleeve as shown in FIG. 1, the flaps 9 serving to grip the sleeve walls and prevent the clip sliding off the sleeve ("milking off") when the sleeve is recovered.

Figure 6:
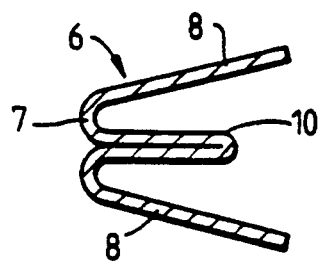
FIG. 6 is a section through a third form of clip.

A third form of clip 6 is shown in FIG. 6. This form of clip is generally as described above but includes an additional central leg 10 which is inserted between the sleeve walls in use. The central leg 10 may be provided to act as a path for rapid transmission of heat to the interior of the sleeve in order to ensure that the adhesive is heated fully. Alternatively, or in addition, it may carry an additionally quantity of adhesive.

Figure 7:
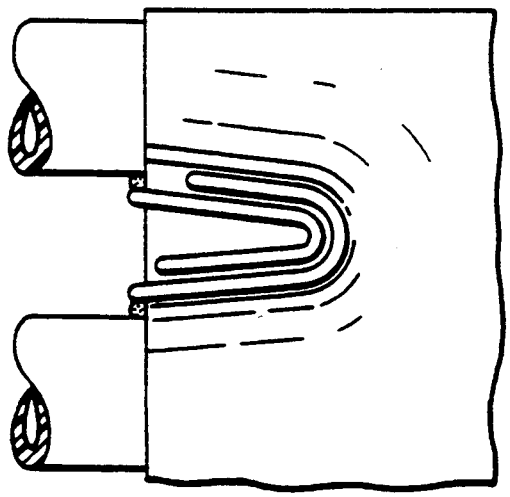
FIG. 7 shows yet another form of clip.

Yet another form of clip is shown in FIG. 7. This form of clip is made from relatively thick (about 2 mm in diameter) coated stainless steel wire 15 which has been bent into substantially a loop configuration and then formed into a clip having external dimensions and an edge profile generally the same as that shown in FIG. 1.

We claim:

1. An arrangement for enclosing a branch-off between a pair of elongate bodies, which comprises a dimensionally recoverable sleeve which can surround the branch-off, and one or more clips which can be positioned about opposed walls of the sleeve to divide the sleeve into channels for the bodies, the or each clip being of unitary form and having a pair of legs that are splayed outwardly to facilitate positioning of the clip over the sleeve walls, the or each clip being mechanically deformable so that the legs can be forced towards each other after the clip has been positioned on the sleeve walls but sufficiently rigid, at least in its deformed state, to resist opening out of the legs under the recovery forces of the sleeve.

2. An arrangement as claimed in claim 1, wherein the clip is generally sheet-like in form, each leg having a major surface that faces the other leg.

3. An arrangement as claimed in claim 2, wherein the clip is formed from pressed sheet material.

4. An arrangement as claimed in claim 2 or claim 3, wherein the thickness of the clip material is in the range of from 0.01 to 0.1 times the length of the legs.

5. An arrangement as claimed in any one of claims 1 to 4, wherein the clip is substantially "U" or "V" shaped.

6. An arrangement as claimed in any one of claims 1 to 5, wherein the clip has legs whose width decreases in a direction away from the central region of the clip.

7. An arrangement as claimed in claim 6, wherein the lateral edges of each leg are relatively straight and subtend an angle in the range of from 10° to 50° to each other.

8. An arrangement as claimed in any one of claims 1 to 7, wherein the clip is formed from a metal.

9. An arrangement as claimed in any one of claims 1 to 8, which includes more than one clip so that three or more channels can be formed.

10. An arrangement as claimed in any one of claims 1 to 9, wherein the dimensionally recoverable sleeve is coated with an adhesive at least in the region of its ends.

11. An arrangement as claimed in claim 10, wherein the adhesive is a particulate curable adhesive.

12. An arrangement as claimed in any one of claims 1 to 11, which includes electrical screening.

13. A method of enclosing a branch-off between a pair of elongate bodies, which comprises:

(i) positioning a dimensionally recoverable sleeve about the branch-off;

(ii) positioning a mechanically deformable clip about opposed walls of the sleeve to divide the sleeve into channels for the bodies, the clip being of unitary form and having a pair of legs that are splayed outwardly to facilitate positioning of the clip over the sleeve;

(iii) forcing the legs of the clip towards each other into engagement with the sleeve walls; and (iv) recovering the sleeve about the branch-off;

the clip being sufficiently rigid, at least after its legs have been forced towards each other, to resist opening out of the legs under the recovery forces of the sleeve.

* * * * *

UNITED STATES PATENT AND TRADEMARK OFFICE
CERTIFICATE OF CORRECTION

PATENT NO. : 5,347,089

INVENTOR(S) : BARRAT et al

DATED : September 13, 1994

It is certified that error appears in the above-identified patent and that said Letters Patent is hereby corrected as shown below:

Column 2, line 31, replace "fores" by --forces--.

Column 2, line 54, replace "from" by --at least--.

Column 6, line 40, delete "Claim 2 or".

Column 6, lines 43-44, replace "any one of claims 1 to 4" by --claim 1--.

Column 6, lines 46-47, replace "any one of claims 1 to 5" by --claim 1--.

Column 6, lines 53-54, replace "any one of claims 1 to 7" by --claim 1--.

UNITED STATES PATENT AND TRADEMARK OFFICE
CERTIFICATE OF CORRECTION

PATENT NO. : 5,347,089

INVENTOR(S) : BARRAT et al

DATED : September 13, 1994

It is certified that error appears in the above-identified patent and that said Letters Patent is hereby corrected as shown below:

Column 6, lines 55-56, replace "any one of claims 1 to 8" by --claim 1--.

Column 6, lines 58-59, replace "any one of claims 1 to 9" by --claim 1--.

Column 6, lines 63-64, replace "any one of claims 1 to 11" by --claim 1--.

Signed and Sealed this

Sixth Day of December, 1994

Attest:

BRUCE LEHMAN

Attesting Officer

Commissioner of Patents and Trademarks